United States Patent [19]
Chang et al.

[11] Patent Number: 6,122,755
[45] Date of Patent: Sep. 19, 2000

[54] METHOD AND APPARATUS FOR FUNCTIONAL TEST OF COMMUNICATION PORT

[75] Inventors: Yu-Chuan Chang, Taipei, Taiwan; Xue-Ning Ren, Shanghai, China

[73] Assignee: Inventec Corporation, Taipei, Taiwan

[21] Appl. No.: 09/217,313

[22] Filed: Dec. 18, 1998

[51] Int. Cl.[7] .................................................. G06F 11/00
[52] U.S. Cl. ............................................ 714/25; 714/735
[58] Field of Search .................................. 714/1, 27, 31, 714/40, 724, 725, 726, 727, 734, 735, 736, 25, 47, 48; 324/537

[56] References Cited

U.S. PATENT DOCUMENTS

| | | |
|---|---|---|
| 5,225,772 | 7/1993 | Cheung et al. ......................... 714/726 |
| 5,430,865 | 7/1995 | Lazik .......................................... 714/1 |
| 5,461,310 | 10/1995 | Cheung et al. ......................... 714/726 |
| 5,757,680 | 5/1998 | Boston et al. ............................. 379/29 |
| 5,875,293 | 2/1999 | Bell et al. ................................. 714/27 |
| 5,895,432 | 4/1999 | Zarchy ..................................... 701/29 |
| 5,909,452 | 6/1999 | Angelotti ................................ 714/726 |
| 6,035,263 | 3/2000 | Jeon ....................................... 702/122 |

*Primary Examiner*—Robert W. Beausoliel, Jr.
*Assistant Examiner*—Christopher Revak
*Attorney, Agent, or Firm*—W. Wayne Liauh

[57] ABSTRACT

The present invention provides a method and apparatus for testing the communication performance of the pins of a serial port. It reads the states of several group of pins to check the existence of the port and the correctness of communication address. Moreover, it checks the working condition of the pins with interruption signals in order to prove the function and communication quality of the serial port.

13 Claims, 6 Drawing Sheets

METHOD AND APPARATUS FOR FUNCTIONAL TEST OF COMMUNICATION PORT

BACKGROUND AND SUMMARY OF THE PRESENT INVENTION

The present invention relates to a method and apparatus for functional test of a communication port, and particularly to a method and apparatus for testing a serial (COM) port to ensure that each pin is good and works well by signal interruption applied on the pins.

Computerized testing software and firmware are the major method for checking quality and performance of computer products by the manufacturers. A product of most common use is a commercial software program called "QA Factory" by Diagsoft. It has almost been a standard of quality and performance test for products of many manufacturers of computers. For the performance test of a serial port, the QA Factory utilizes a firmware connected to the serial port, and a testing software installed in a computer for transmitting signals to the firmware and the serial port and detecting the responsive signals in the pins of the serial port. The detected signals can be judged for the performance of the pins. But the tests of prior arts by traditional firmware and software are obviously insufficient. The software and firmware are only to detect the existence of the serial port and the address of the port, but not to verify if the port works well. The firmware cannot support test of the working performance either. Even in the test of QA Factory, only the second pin (RD), third pin (TD), fourth pin (DTR), sixth pin (DSR), seventh pin (RTS) and the eighth pin (CTS) are tested, but functions of the first pin (DCD) and the ninth pin (RI) are ignored. In the process of testing outer interruptions, the serial port are only tested by interruptions generated when receiving a full data and transmitting a full data, but not further tested by interruptions caused by signal changing in the pins of CTS, DCD, DSR and RI.

The primary object of the present invention is to provide a method for testing the performance of the CTS, DCD, DSR and RI pins of a serial port, and to solve the problems of prior arts which provide no test on the DCD and RI pins, and insufficient test on the CTS, DCD, DSR and RI pins.

The testing method of the present invention is to monitor the change of signals on the CTS and the DCD pins each time when a signal applied on the RTS pin is changed; and to monitor the change of signals on the CTS and RI pins each time when a signal applied on the DSR pin is changed. The testing method also provides testing data resembling to the CTS and DSR pins for testing outer interruption by varying signal levels through a firmware, and checks the interruption by changing signals on CTS, DCD, DSR and RI pins. Therefore, it is not only to detect the interruption caused by receiving a full data or transmitting a full data.

The objectives and advantages of the present invention will become apparent from a detailed description provided below, with reference to the accompanying drawings.

DETAILED DESCRIPTION OF PREFERRED EMBODIMENTS

Figure 1:
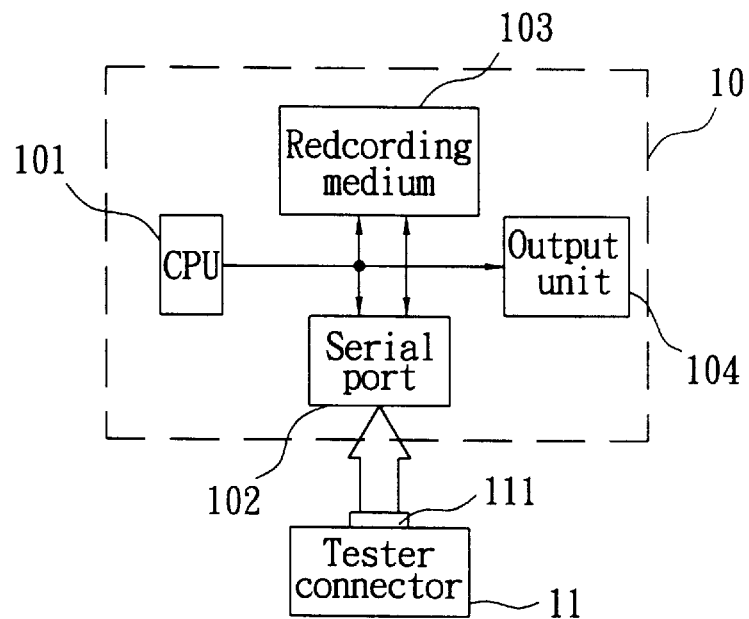
FIG. 1 is a block diagram showing a hardware composition according to the present invention.
Figure 2:
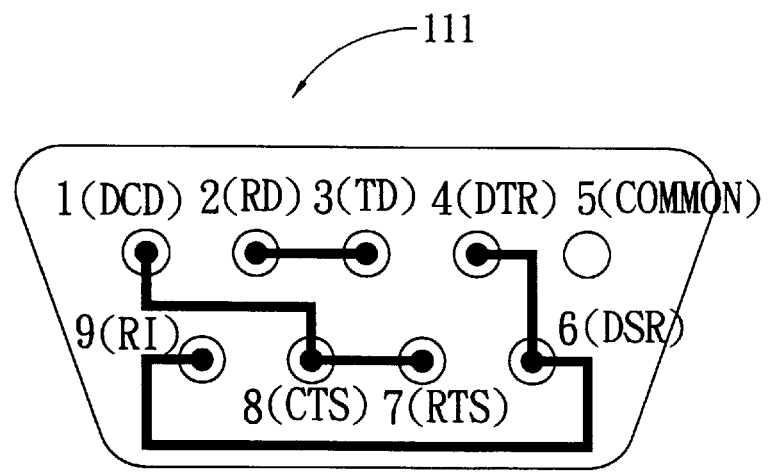
FIG. 2 is a descriptive diagram showing a connector port of a firmware according to the present invention.

Referring to FIG. 1, a hardware composition of a testing system according to the present invention is shown. The testing system comprises:

a CPU (central processing unit) 101, incorporated in a computer 10, for executing test (e.g., performance test) of a serial port (COM port) 102, and generating a report in accordance with the test result;

a recording medium 103, such as hard disk, floppy disk, magnetic tape, optic disk or memory unit, for storing the software required for the test and the track record of the test;

a tester connector, i.e. a firmware, 11 for connecting the serial port 102 to the computer 10. The tester connector 11 includes a connector port 111, for example a D type connector, which is shown in FIG. 2. In the connector port 111, the pins of number 1, 8 and 7 are linked (short circuit); number 2 and 3 are linked; and number 4, 6 and 9 are linked; and an output unit 104, such as a monitor or printer, for exporting the test result.

For easy understanding of the following description, the function of the pins of a connector port 111 is first described below.

~ DCD (Data Carrier Detect, pin 1): for detecting the data loading during communication. It keeps at high level when there is a signal.

~ RD (Received Data, pin 2): for receiving data.

~ TD (Transmitted Data, pin 3): for transmitting data.

~ DTR (Data Terminal Ready, pin 4): for providing a signal when the data terminal is ready.

~ Common (pin 5): for signal grounding.

~ DSR (Data Set Ready, pin 6): for providing a signal when data is ready.

~ RTS (Require To Send, pin 7): for providing a signal to request data transmission.

~ CTS (Clear To Send, pin 8): for providing a signal to stop data transmission.

~ RI (Ring Indicator, pin 9): for providing a ring signal.

Figure 3:
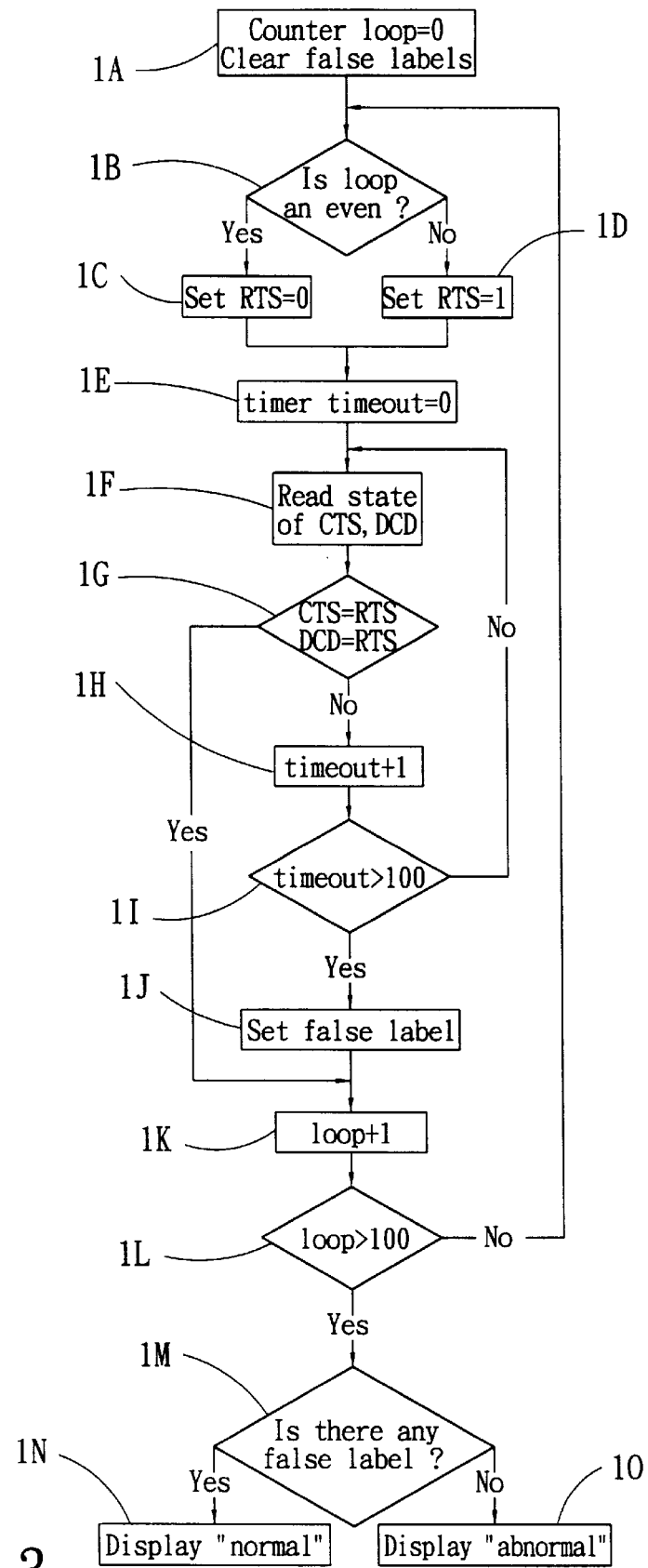
FIG. 3 is a flowchart showing a test on RTS-CTS and DCD pins of a serial port.

FIG. 3 is a flowchart showing a test on RTS-CTS and DCD pins of a serial port. The test procedure includes the following steps:

Step 1A: First resetting the counter of test and clearing the record of false labels;

Steps 1B, 1C and 1D: Judging if the testing loops are of even number. If yes, set the RTS pin to low electric level (step 1C), or set the RTS to high level (step 1D);

Step 1E: Setting the timer to zero;

Step 1F: Reading the state of CTS and DCD pins;

Step 1G: Judging if the state of CTS and DCD pins are at high level. If yes, jumps to step 1K, or proceeds to step 1H;

Step 1H: Adding the counter with one;

Step 1I: Judging if the counter exceeds 100, then proceeds to step 1J, or returns to step 1F;

Step 1J: Setting a false label in the recording medium 103;

Step 1K: Adding the counter with one;

Step 1L: Judging if the counter is below 100, then returns to step 1B, or proceeds to step 1M;

Step 1M: Checking if there is any false label in the recording medium 103. If yes, jumps to step 1O, or proceeds to step 1N;

Step 1N: Displaying a message of "normal" on the display 104 of the computer 10; and Step 1O: Displaying a message of "abnormal"0 on the display 104 of the computer 10.

Figure 4:
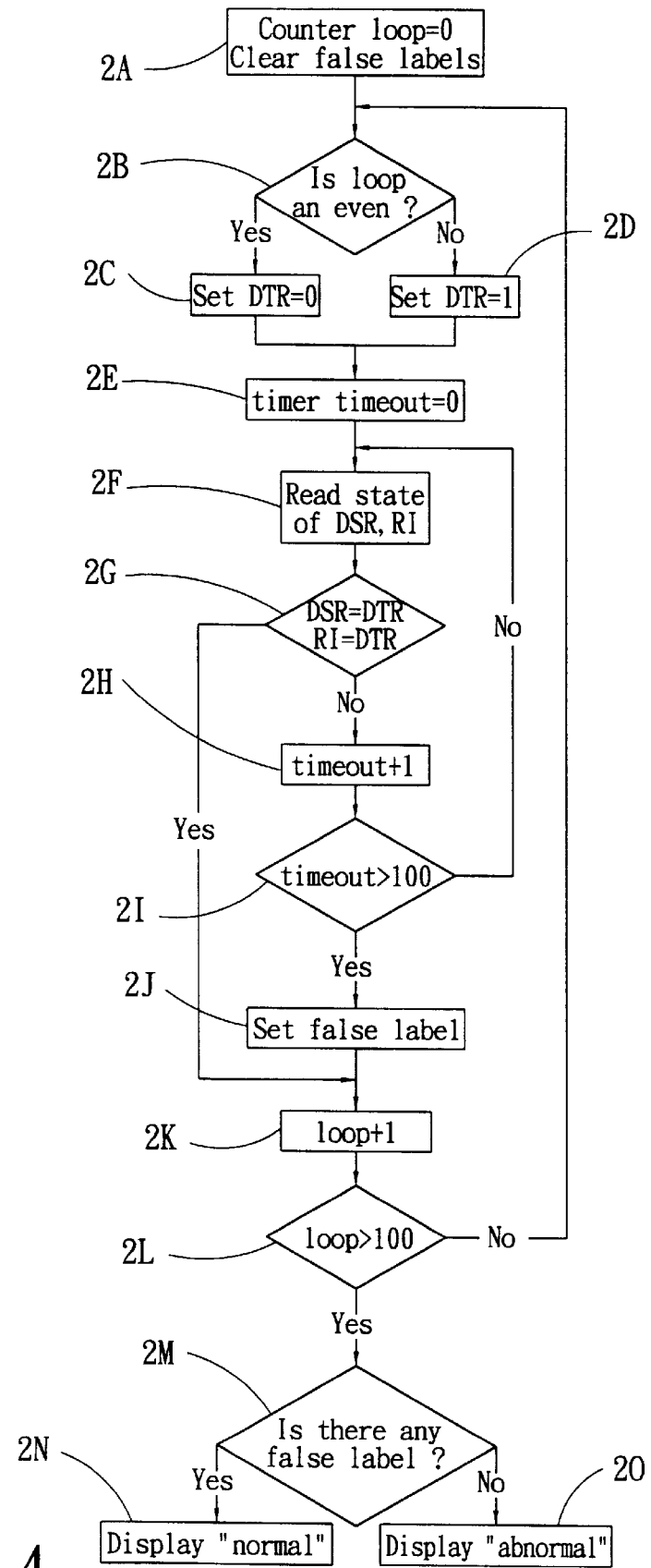
FIG. 4 is a flowchart showing a test on DTR-DSR and RI pins of a serial port.

FIG. 4 is a flowchart showing a test on DTR-DSR and RI pins of a serial port; The test procedure is similar to the previous one and includes the following steps:

Step 2A: First resetting the counter of test and clearing the record of false labels;

Steps 2B, 2C and 2D: Judging if the testing loops are of even number. If yes, set the DTR pin to low electric level (step 2C), or set the DTR to high level (step 2D);

Step 2E: Setting the timer to zero;

Step 2F: Reading the state of DSR and RI pins;

Step 2G: Judging if the state of DSR and RI pins are at high level. If yes, jumps to step 2K, or proceeds to step 2H;

Step 2H: Adding the counter with one;

Step 2I: Judging if the counter exceeds 100, then proceeds to step 2J, or returns to step 2F;

Step 2J: Setting a false label in the recording medium 103;

step 2K: Adding the counter with one;

Step 2L: Checking if the counter is below 100, then returns to step 1B, or proceeds to step 2M;

Step 2M: Checking if there is any false label in the recording medium 103. If yes, jumps to step 2O, or proceeds to step 2N;

Step 2N: Displaying a message of "normal" on the display 104 of the computer 10; and Step 2O: Displaying a message of "abnormal" on the display 104 of the computer 10.

Figure 5:
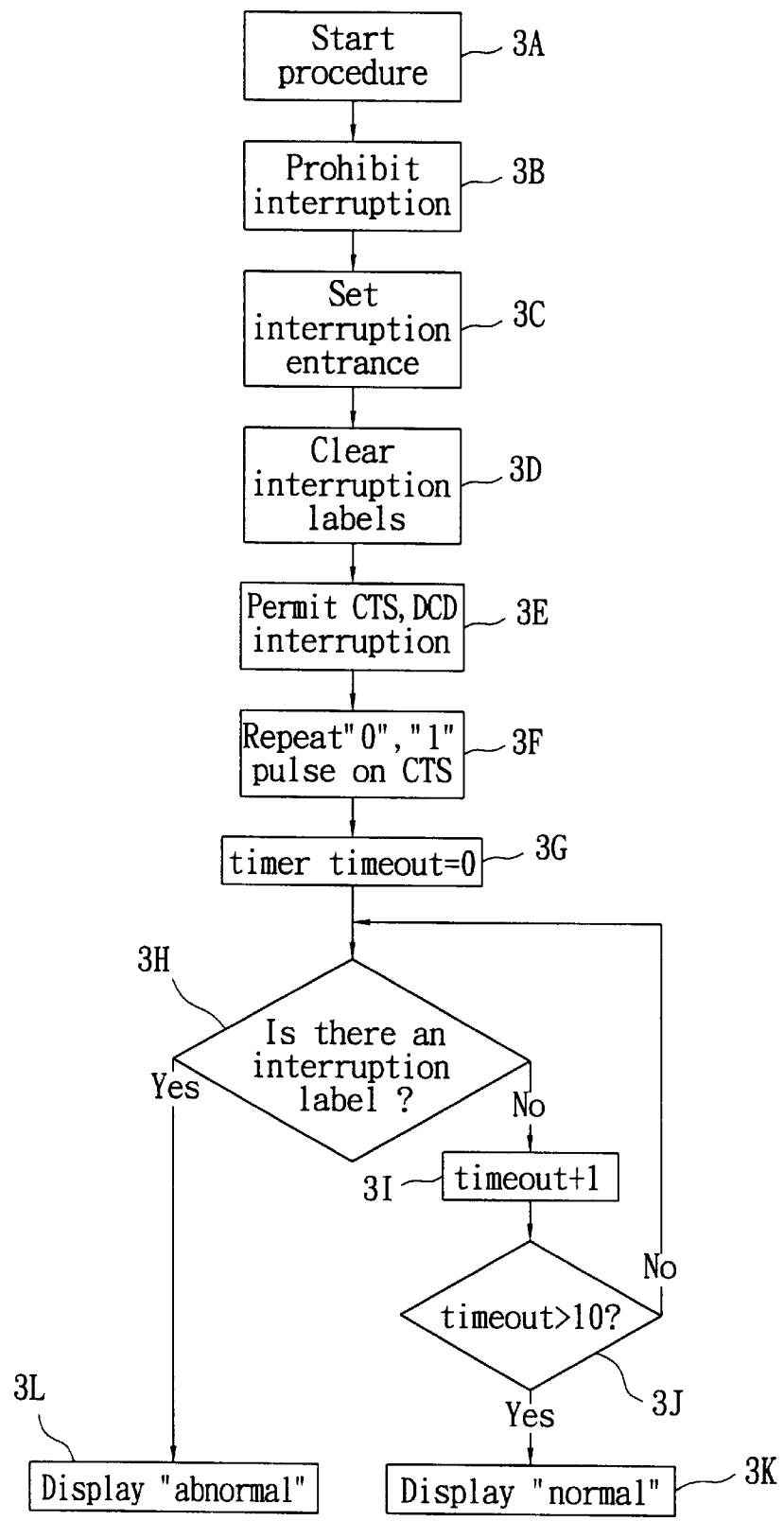
FIG. 5 is a flowchart of an interruption test on CTS and DCD pins of a serial port.

FIG. 5 is a flowchart of an interruption test on CTS and DCD pins of a serial port. The testing procedure includes the following steps:

Step 3A: Starting main procedure;

Step 3B: The CPU 101 prohibits inner interruption occurs;

Step 3C: Setting an outer interruption entrance;

Step 3D: Clearing all existing interruption labels in the system;

Step 3E: Permitting interruption request from the CTS and DCD pins;

Step 3F: The tester connector 11 provides a changing signal data of repeating high-low pulses to the CTS pin;

Step 3G: Setting the timer to zero;

Step 3H: Checking if there is any interruption label (see Note 1 described later with FIG. 7). If yes, jumps to step 3L, or jumps to step 3I; (Because the signal on DCD pin indicates that the serial port is in communication, when the CTS and DCD pins are carrying continuous changing signals, a controlling unit in the serial port 102 will request a CTS or DCD interruption to the CPU 101, then an interruption label will be generated)

Step 3I: Adding the counter with one;

Step 3J: Checking if the counter exceeds 10, then proceeds to step 3K, or returns to step 3H;

Step 3K: Displaying a message of "abnormal" on the display 104 of the computer 10; and Step 3L: Displaying a message of "normal" on the display 104 of the computer 10.

Figure 7:
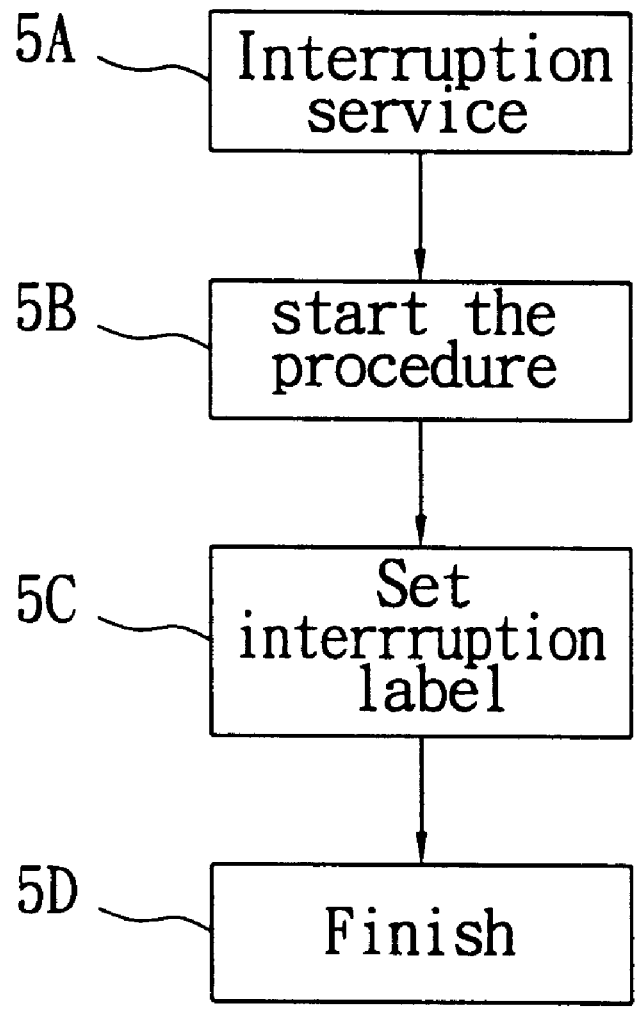
FIG. 7 is a flowchart showing the procedure of interruption service.

[Note 1] Please referring to FIG. 7, an interruption label is generally generated by the following steps:

Step 5A: An interruption is requested by a peripheral device or other processing units to the CPU 101;

Step 5B: The CPU 101 executing an interruption service procedure upon receiving an interruption request;

Step 5C: The CPU 101 generating a corresponding interruption label according to the interruption request; and Step 5D: Finishing the interruption service procedure.

Figure 6:
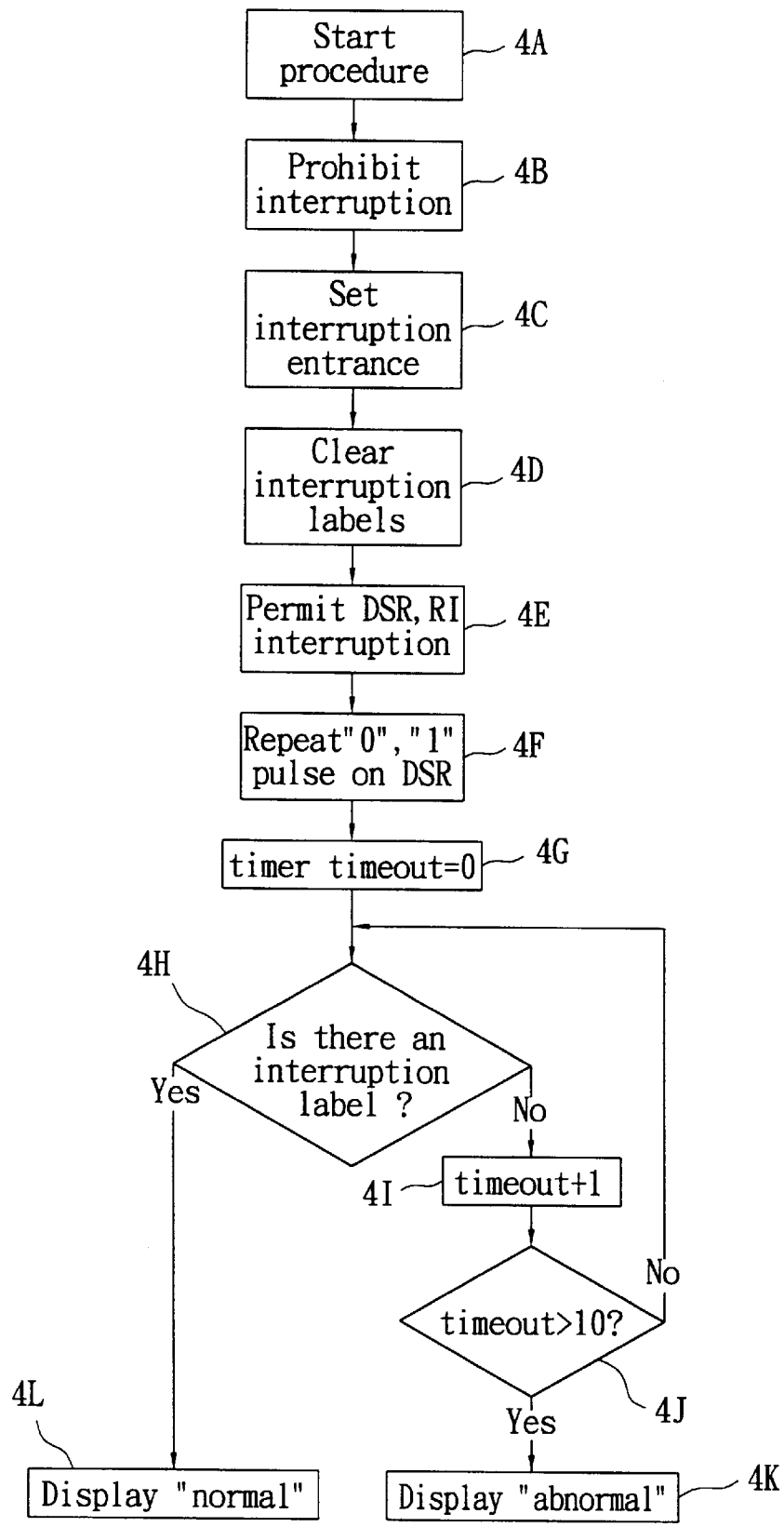
FIG. 6 is a flowchart of an interruption test on DSR and RI pins of a serial port.

FIG. 6 is a flowchart of an interruption testing on DSR and RI pins of a serial port. The procedure is similar to the previous one in FIG. 5 and includes the following steps:

Step 4A: Starting main procedure;

Step 4B: The CPU 101 prohibits inner interruption occurs;

Step 4C: Setting an outer interruption entrance;

Step 4D: Clearing all existing interruption labels in the system;

Step 4E: Permitting interruption request from the DSR and RI pins;

Step 4F: The tester connector 11 provides a changing signal data of repeating high-low pulses to the DSR pin;

Step 4G: Setting the timer to zero;

Step 4H: Checking if there is any interruption label (see Note 1 described above with FIG. 7). If yes, jumps to step 4L, or jumps to step 4I; (Because when the DSR and RI pins are carrying continuous changing signals, a controlling unit in the serial port 102 will receive the pulse data or the ringing signal of RI pin, and request a CTS or DCD interruption to the CPU 101, then an interruption label will be generated)

Step 4I: Adding the counter with one;

Step 4J: Checking if the counter exceeds 10, then proceeds to step 4K, or returns to step 4H;

Step 4K: Displaying a message of "abnormal" on the display 104 of the computer 10; and Step 4L: Displaying a message of "normal" on the display 104 of the computer 10.

In conclusion, the method and apparatus according to the present invention not only to test the communication performance of the pins of a serial port but also to test if the pins work well in dynamic interruption conditions in order to prove the function and communication quality of the serial port.

Although the invention has been described in connection with preferred embodiments, it will be understood by those skilled in the art that various changes may be made without departing from its scope.

What is claimed is:

1. A method for testing functions of a specific group of pins in a serial port, comprising the steps a)–f) wherein:

a) setting a signal from an RTS pin or a DTR pin as a reference signal;

b) taking an electric level from said group of pins;

c) judging if said level from said group of pins is the same as that from said reference signal, jumping to step e) if yes, or proceeding to step d);

d) judging if time for receiving data exceeds a predetermined period, jumping to step f) if yes, or returning to step b);

e) finding out an abnormal pin and recording to a recording medium accessible by a computer; and f) judging if said test is finished, displaying said record in said recording medium if yes, or returning to step a).

2. A method for testing functions of pins in a serial port according to claim 1 wherein said reference signal is taken from RTS pin.

3. A method for testing functions of pins in a serial port according to claim 2 wherein said specific group of pins includes CTS pin and DCD pin.

4. A method for testing functions of pins in a serial port according to claim 1 wherein said reference signal is taken from DTR pin.

5. A method for testing functions of pins in a serial port according to claim 4 wherein said specific group of pins includes DSR pin and RI pin.

6. A method, by using a computer, for testing functions of pins in a serial port during outer interruption signals with the signals from a CTS pin and a DCD pin, or from a DSR pin and an RI pin, being applied on a plurality of specific pins, said method comprising the steps of a) prohibiting inner interruption from occuring in said computer;

b) setting an outer interruption entrance;

c) permitting an interruption request of said outer interruption signals;

d) loading from said specific pins some pulse data resembling said outer interruption signals; and e) checking if an interruption label occurs in said interruption entrance, finding out any abnormal pin, and recording the result to a medium accessible for said computer.

7. A method for testing functions of pins in a serial port according to claim 6 wherein said outer interruption signals are CTS signal and DCD signal.

8. A method for testing functions of pins in a serial port according to claim 6 wherein said outer interruption signals are DSR signal and RI signal.

9. A method for testing functions of pins in a serial port according to claim 6 wherein said pulse data are generated from repeating signals with high and low electric levels.

10. A method for testing functions of pins in a serial port according to claim 6 wherein said interruption label is generated after a control unit in said serial port fully receiving said pulse data from said specific pins.

11. An apparatus for testing functions of a specific group of pins in a serial port, comprising a CPU in a computer for executing testing procedures;

a recording medium, accessible for said computer, for storing record of said testing;

a tester connector for connecting said serial port to said CPU, wherein pins of said serial port are linked into three individual short circuits: DCD with RTS and CTS, RD with TD, and DTR with DSR and RI.; and an output unit for exporting said test record.

12. An apparatus for testing functions of pins in a serial port according to claim 11 wherein said recording medium is a magnetic disk.

13. An apparatus for testing functions of pins in a serial port according to claim 11 wherein said output unit is a display.

* * * * *